United States Patent
Lim

[11] Patent Number: 5,368,614
[45] Date of Patent: Nov. 29, 1994

[54] PREPARATION OF POLYMER-IMPREGNATED BATTERY SEPARATOR MATERIAL AND CELL MADE THEREWITH

[75] Inventor: Hong S. Lim, Agoura Hills, Calif.

[73] Assignee: Hughes Aircraft Company, Los Angeles, Calif.

[21] Appl. No.: 215,145

[22] Filed: Mar. 21, 1994

[51] Int. Cl.$^5$ .............................................. H01M 2/14
[52] U.S. Cl. .................................. 29/623.5; 427/352; 427/421
[58] Field of Search .......................... 29/623.5, 623.1; 427/331, 337, 352, 353, 421; 429/249, 251

[56] References Cited

U.S. PATENT DOCUMENTS 3,873,368  3/1975  Pickett .
4,233,347  11/1980 Lim et al. .
4,820,597  4/1989  Lim et al. .
4,935,318  6/1990  Ikoma et al. .
5,108,851  4/1992  Furukawa et al. .

OTHER PUBLICATIONS

Hong S. Lim et al., "Separator Evaluation in Nickel Cadmium Alloys" seven page manuscript submitted to IECEC-90, Aug. 1990.

Primary Examiner—Anthony Skapars
Attorney, Agent, or Firm—Elizabeth E. Leitereg; Terje Gudmestad; W. K. Denson-Low

[57] ABSTRACT

An electrochemical cell (56) is made by furnishing an anode (52) and a cathode (54), preparing a separator (58), and placing the separator (58) between the anode (52) and the cathode (54). The separator (58) is prepared by furnishing a sheet of a porous separator substrate (40), preparing a solution of a water insoluble polymer in an organic solvent, spraying the solution onto both sides of the separator substrate (40), spraying water onto both sides of the separator substrate (40), and drying the separator substrate (40).

17 Claims, 2 Drawing Sheets

TOTAL AMOUNT OF ELECTROLYTE, g

PREPARATION OF POLYMER-IMPREGNATED BATTERY SEPARATOR MATERIAL AND CELL MADE THEREWITH

BACKGROUND OF THE INVENTION

This invention relates to tile fabrication of an electrochemical cell, and, more particularly, to the preparation of a porous separator and the use of the separator in the cell.

Rechargeable electrochemical storage cells or batteries are electrochemical devices for storing and retaining an electrical charge and later delivering that charge for useful power. Familiar examples of the rechargeable cell are the lead-acid cell used in automobiles and the nickel-cadmium cell used in various portable electronic devices. Other, less familiar types of cells include nickel-hydrogen and nickel-metal hydride cells.

Many advanced electrochemical cells are constructed with sets of thin, sheetlike anodes and cathodes. These electrodes are soaked or immersed in an electrolyte of the cell. To prevent the electrodes from touching and shorting, a porous, sheetlike separator is placed between the pales of anodes and cathodes. The electrolyte is infiltrated into the pores of the separator structure to ensure an ionic conductive path between the pairs of electrodes.

An example of a separator material used in advanced electrochemical cells such as the nickel-cadmium cell is porous zirconium oxide (zirconia) fabric. To improve the mechanical strength of the otherwise-fragile zirconium oxide fabric and ensure long-life stable operation off the cell, the zirconium oxide fabric is impregnated with a water insoluble polymeric material. Such materials include, for example, polybenzimidazole or polysulfone, which are chemically stable and wettable in the electrolyte, which is typically a potassium hydroxide solution. The cell is then assembled using this separator material.

In conventional practice, the separator is prepared by dissolving the polymer into a water-miscible organic solvent such as N,N-dimethylacetamide, and then soaking small sheets of the zirconium oxide fabric in the solution. The sheets are removed from the solution and blotted to remove the excess amount of solution. The sheets are next immersed into deionized water to precipitate the polymer onto the fabric and to remove the solvent. In a typical implementation of this approach, a small sheet (typically 4 inches by 8 inches, as limited by the mechanical strength of the fabric) of the polymer-solution soaked zirconium oxide fabric is immersed into a pool of several gallons of deionized water, resulting in a large amount of solvent-contaminated water for each square foot of processed separator. This procedure is described more fully in U.S. Pat. No. 4,293,347, whose disclosure is incorporated by reference. Because these steps are performed manually, the cost of the separator can be as high as about 30 percent of the total cost of the cell, and there is a relatively large amount of waste material such as contaminated water to be disposed of.

There is always a need for improved fabrication techniques for producing such cells at lower cost. The present invention fulfills this need, and provides related advantages.

SUMMARY OF THE INVENTION

The present invention provides an economic method for preparing a polymer-impregnated separator material and an electrochemical cell utilizing the separator material. The present approach reduces the cost of preparation of the separator material and thence the cell. The method results in less waste material to be treated and disposed of, and thence less potential environmental pollution.

In accordance with the invention, a method for preparing a separator for an electrochemical cell includes furnishing a sheet of a porous separator substrate having two sides. A preferred separator substrate is a ceramic fabric or a felt, with a most preferred substrate being a porous zirconium oxide fabric. The substrate is preferably supported on a screen-like support that permits access to both sides of the fabric.

A solution of a polymer in an organic solvent is prepared. A preferred solution is polybenzimidazole polymer in N,N-dimethylacetamide solvent, or polysulfone polymer in N,N-dimethylformamide solvent.

The solution is sprayed onto both sides of the separator substrate. The amount of polymer ultimately residing in the separator can be controlled by the concentration of the polymer in the sprayed solution and/or the duration of the spraying. Care is taken to achieve a uniform spray pattern onto the substrate.

A liquid, preferably water, that dissolves the solvent but not the polymer is thereafter sprayed onto both sides of the separator substrate. The liquid is preferably first sprayed at a high volumetric flow rate to cause the polymer to precipitate from the solution onto the solid substrate. The flow rate is thereafter reduced to thoroughly wash the remaining organic solvent from the substrate.

The separator prepared in this manner is utilized in the same way as a conventionally prepared separator. It is assembled with the appropriate sheet anode and cathode to form an electrochemical cell. In a typical case, many pairs of electrodes are assembled together in the same casing, and electrically interconnected in series and/or parallel arrangements to produce a battery having the desired voltage and current characteristics.

This approach to the preparation of the separator and the cell reduces their cost, without a reduction in performance. Waste product cleanup requirements are also reduced. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
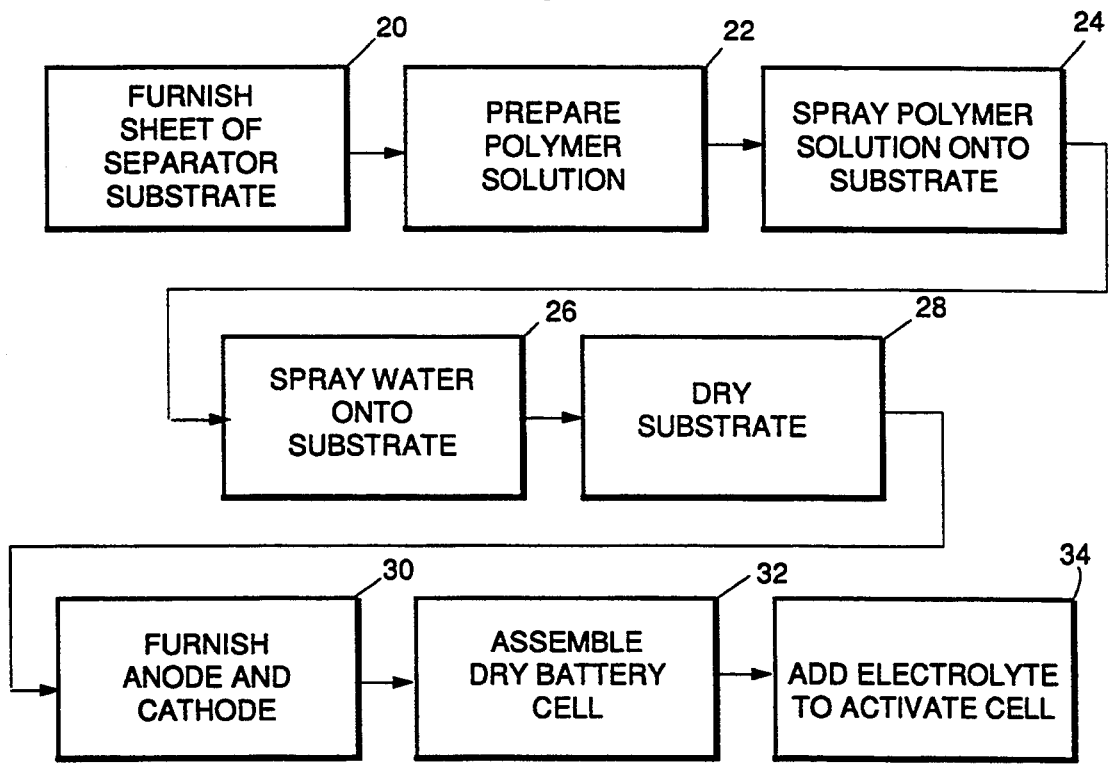
FIG. 1 is a block diagram flow chart for the method of the invention.
Figure 2:
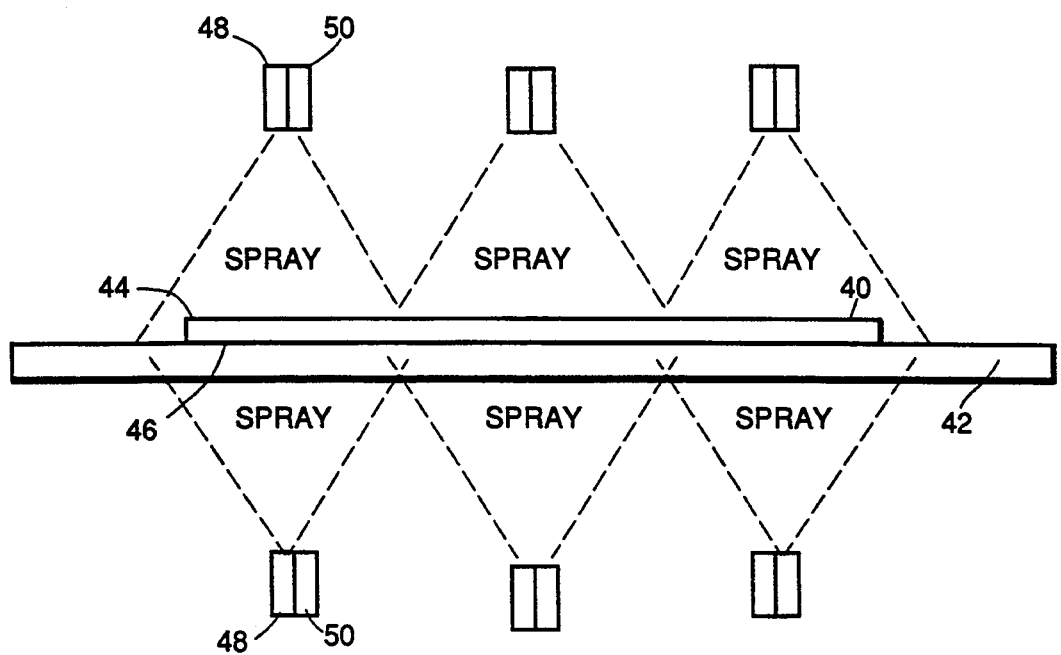
FIG. 2 is a schematic drawing of a spray apparatus for practicing the invention.

FIG. 1 depicts the preparation of a separator according to the invention, and the utilization of the separator in an electrochemical cell. FIG. 2 shows the preferred spray approach.

To prepare the separator, a sheet of porous separator substrate material 40 is furnished, numeral 20. The separator substrate material is any operable porous material that is stable for extended numbers of charge/discharge cycles in the selected electrolyte and has desirable separator properties such as high electrolyte retention and oxygen gas permeability. The preferred substrate material 40 is a sheet of a ceramic fabric or felt, typically having a thickness of about 0.008–0.016 inches. A most preferred substrate material 40 is zirconium oxide (zirconia) fabric. Such a material is stable in potassium hydroxide solution electrolyte. Suitable zirconium oxide fabric is available commercially from Zircar Products, Inc., Florida, N.Y.

In the present processing, the substrate 40 is supported on a support 42. The support 42 is a screen having an open mesh structure that permits spray access to both sides 44, 46 of the substrate.

An organic solution of a water-insoluble polymer and a water-miscible organic solvent to be applied to the substrate 40 is prepared, numeral 22. The polymer is preferably polybenzimidazole (sometimes abbreviated as PBI), and the solvent is preferably N,N-dimethylacetamide. The solution is prepared as 5–15 percent by weight (of the total solution) of the polybenzimidazole in the N,N-dimethylacetamide. Another polymer/solvent combination is 5–15 percent (of the total solution) of polysulfone polymer in N,N-dimethylformamide solvent. These relative amounts of polymer and solvent are chosen to have a viscosity that permits their spraying. The solutions are readily prepared at ambient temperature with mild stirring.

The polymer solution is sprayed onto the substrate, numeral 24, through a number of polymer solution spray nozzles 48. Care is taken to achieve an even application to both sides 44 and 46 of the substrate 40. The nozzles or the substrate may be moved in a pre-determined pattern to achieve a uniform stray of the solution onto the substrate. Slight irregularities in the spray pattern are tolerated, however. A predetermined amount of the solution, and thence the polymer, is sprayed onto the substrate 40. The amount of polymer applied to the substrate is determined by the concentration of the solution, the spray pattern of each spray nozzle, the throughput of each spray nozzle, and the total time of spraying, and may be readily calculated. One practical approach to varying the amount of polymer applied to the substrate 40 is to maintain all parameters constant except for the spray time, and examples of this approach will be discussed below.

After the polymer solution is applied to the substrate 40, a liquid which dissolves the organic solvent but not the polymer, such as, for example, water, methanol, or ethanol, is sprayed onto both sides 44 and 46 of the substrate 40 through water spray nozzles 50, numeral 26. Water is preferred, because it is inexpensive and readily cleaned for disposal. Although in theory it is possible to use the same nozzles for spraying polymer solution and water, because the polymer is water insoluble this approach is not preferred. In the apparatus depicted in FIG. 2, pairs of polymer spray nozzles 48 and water spray nozzles 50 are mounted together, side by side, to achieve uniform coverage by both sprays. Alternatively, the polymer spray nozzles 48 can be mounted on one fixture and the water spray nozzles 50 on another fixture. The substrate on the support 42 is placed into the appropriate fixture during the spraying process.

A high purity water such as de-ionized water is sprayed onto the sides 44 and 46 of the substrate through the water spray nozzles 50. In the preferred approach, the water is sprayed at a high volumetric flow rate initially for about 1–3 minutes to cause precipitation of the polymer onto the surfaces of the substrate. That is, because the polymer is insoluble in water, it deposits upon the substrate 40 as the organic solvent is displaced by water. The water flow rate is thereafter reduced to conserve water, and spraying is continued for an additional 15–30 minutes to thoroughly remove all of the organic solvent from the porosity of the substrate.

The spraying operations 24 and 26 are preferably conducted inside a fume hood or other type of ventilator system wherein any vapors containing either the polymer or the solvent can be captured. The runoff water that contains solvent and possibly a small amount of polymer is also captured in a sump. The captured organic compounds are processed by conventional techniques such as decomposition and/or scrubbing, so that no noxious or environmentally damaging compounds are released.

After spraying, the impregnated substrates are dried in any operable manner. In the preferred approach, the substrates are dried in air in an oven at 100° C. or less, or in a vacuum oven, numeral 28.

The preparation of a separator is now complete. The remaining steps of FIG. 1 relate to the preparation of an electrochemical cell that utilizes the separator.

An anode 52 and a cathode 54 are furnished, numeral 30. These electrodes 52 and 54 are prepared by any suitable approach for the particular type of cell that is to be constructed. For example, the electrodes can be those used in a nickel/cadmium cell, as described in U.S. Pat. No. 3,873,368 (cadmium electrode) and U.S. Pat. No. 4,820,597 (nickel electrode), a nickel/hydrogen cell, as described in U.S. Pat. No. 4,820,597, or a nickel/metal hydride cell, as described in U.S. Pat. Nos. 4,935,318 and 5,108,851. The disclosures of all of these patents are incorporated by reference.

Figure 3:
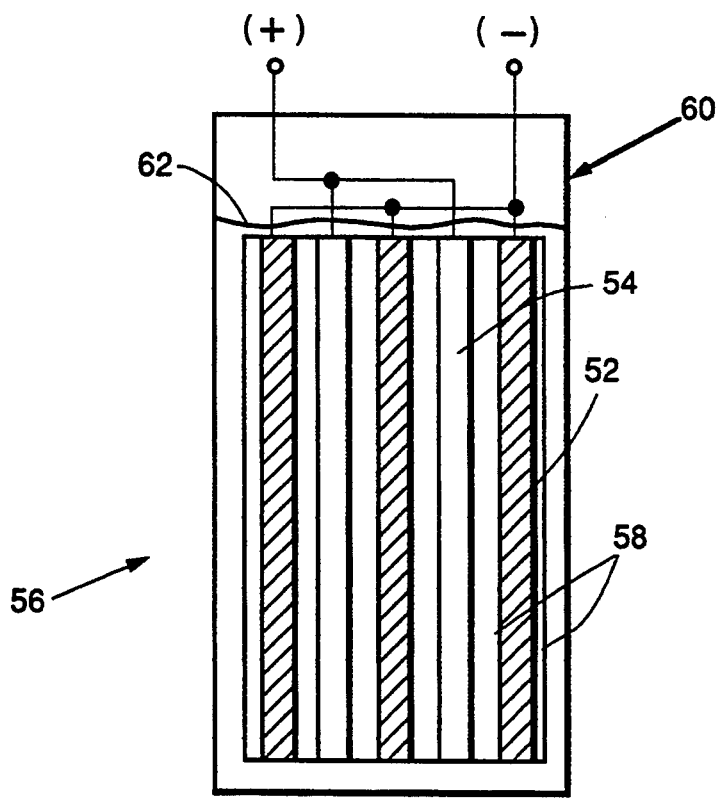
FIG. 3 is a schematic side elevational view of an electrochemical cell prepared by the approach of the invention.

As shown in FIG. 3, an electrochemical cell 56 is assembled with the anode 52, the cathode 54, and a separator 58 made according to the procedure described previously, numeral 32. The separator 58 is positioned between the anode 52 and the cathode 54. External leads are provided to the anode and to the cathode, and the assembly is placed into a container 60. The components of the cell are held together by any appropriate structure such as the body of the container 60. It is usually the case that multiple alternating layers of anodes, cathodes, and separators are assembled within the container 60, as shown in FIG. 3. Internal and external connections are made so that the cell 56 has the required voltage and current outputs.

An electrolyte 62 is added to the container 60, numeral 84. The electrolyte is that which is appropriate for the combination of anode, separator, and cathode that has been selected. A typical electrolyte is a solution of from about 20 to about 40 volume percent of potassium hydroxide in water, with a most preferred composition being about 31 volume percent of potassium hydroxide in water.

The following examples are presented to illustrate aspects of the invention, and should not be taken as limiting the invention in any respect.

A total of 17 sheets of zirconium oxide fabric, each about 4 inches square, were impregnated by the approach of the invention. (Samples 1-7 were prepared on one day, and samples 8-18 were prepared on a second day, with slightly different polymer spray nozzle settings.) The polymer solution contained 8.0 grams of polybenzimidazole per 100 milliliters of solution, and the solvent was N,N-dimethylacetamide. A DeVilbiss Model JGA spray gun was used for the polymer solution, and a DeVilbiss Model TGA 514 spray gun was used to spray de-ionized water. The spray guns each operated at 29 psig nitrogen pressure. The nozzle opening in each case was about 80 degrees from the full closure point, and the spraying was conducted with the nozzle about 6-8 inches from the substrate. After spraying was complete, the substrates were inspected for uniformity of application, which could be determined visually since the polymer has a brown color. An acceptable even coating of the polymer was achieved.

The separators were weighed before and after processing, and the weight gain determined. The following table presents the weight gains as a function of spray time of the polymer solution.

TABLE

| ID Number | Spray time (sec) | Weight Gain, percent |
|---|---|---|
| 1 | 30 | 4.4 |
| 2 | 40 | 5.1 |
| 3 | 50 | 7.1 |
| 4 | 45 | 6.4 |
| 5 | 40 | 5.1 |
| 6 | 40 | 5.3 |
| 7 | 40 | 6.0 |
| 8 | 50 | 6.8 |
| 9 | 50 | 6.9 |
| 10 | 50 | 8.0 |
| 11 | 55 | 8.5 |
| 12 | 51 | 5.7 |
| 13 | 42 | 6.0 |
| 14 | 55 | 6.8 |
| 15 | 45 | 5.4 |
| 16 | 45 | 6.3 |
| 17 | 50 | 7.3 |

All of the samples were within an acceptable range. The amount of polymer could be varied by changing the spray time within a relatively narrow range. A more dilute solution of the polymer would permit greater precision in selecting the polymer loading of the substrate by varying the spray time.

To evaluate the electrolyte retention of the separator prepared according to the invention against the standard separator material used in nickel/cadmium electrochemical cells, a stack of components was made as follows, where each component was a 1.5 inch diameter disk:

Solid end plate
Nylon felt
Sample #7 (see Table)
nickel electrode
piece of filter paper
Sample #2 (see Table)
Sample #8 (see Table)
piece of filter paper
nickel electrode
Sample #11 (see Table)
nylon felt
Solid end plate The components of the stack were individually weighed before assembly. The stack was soaked overnight in a 31 percent by volume potassium hydroxide electrolyte solution, and removed from the electrolyte. The components were individually weighed to determine the amount of electrolyte retention in each component. Some electrolyte was intentionally removed by blotting using two sheets of filter paper. The wet filter papers were removed, and the stack was allowed to stand for about 30 minutes to reach an equilibrium distribution of the electrolyte. The individual components were again weighed. The removal of electrolyte and individual component weighing were repeated twice more.

Figure 4:
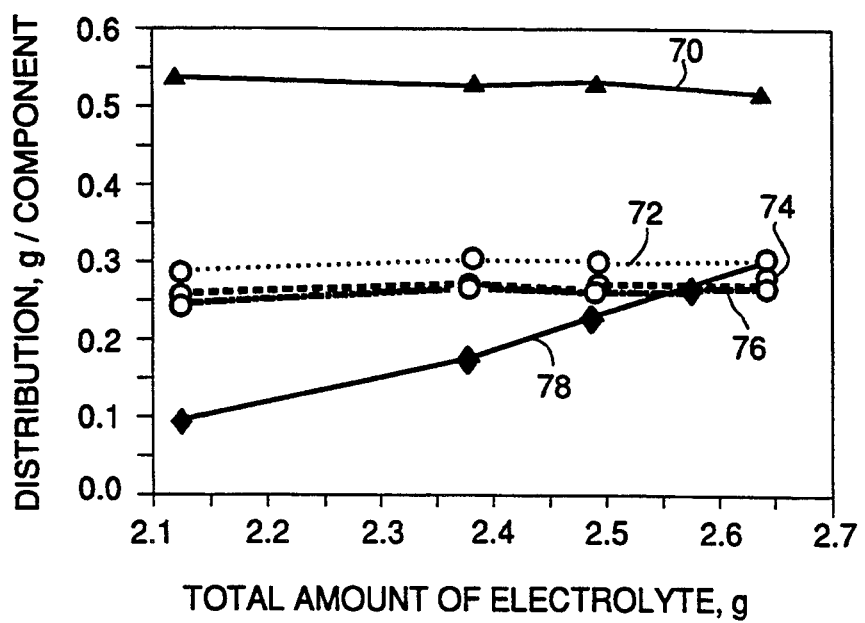
FIG. 4 is a graph of the relative amounts of electrolyte retention as a function of electrolyte loading for separators prepared according to the invention and for a conventional nylon felt separator.

FIG. 4 shows the results of this test. The separators made according to the invention, numerals 72, 74, 76, showed essentially no change in their electrolyte retention as the electrolyte loading varied. By comparison, the electrolyte in the nylon felt separator, numeral 78, varied significantly as a function of electrolyte loading. (Electrolyte retention for a nickel electrode, numeral 70, is included for comparison.) Thus, the performance of the present separators is expected to be superior to that of the nylon felt traditionally used in nickel/cadmium cells.

The present invention thus provides an economical, environmentally acceptable approach to the manufacture of separators for electrochemical cells. Although a particular embodiment of the invention has been described in detail For purposes of illustration, various modifications may be made without departing from the spirit and scope of the invention. Accordingly, the invention is not to be limited except as by the appended claims.

What is claimed is:

1. A method for preparing a separator for an electrochemical cell, comprising the steps of:
   furnishing a sheet of a porous separator substrate having two sides;
   preparing a solution of a polymer in an organic solvent;
   spraying the solution onto both sides of the separator substrate; and thereafter
   spraying a liquid that dissolves the organic solvent but not the polymer onto both sides of the separator substrate.

2. The method of claim 1, wherein the step of furnishing includes the step of
   furnishing a porous ceramic separator substrate.

3. The method of claim 1, wherein the step of furnishing includes the step of
   furnishing a porous zirconium oxide separator substrate.

4. The method of claim 1, wherein the step of furnishing includes the step of
   furnishing a porous felt separator substrate.

5. The method of claim 1, wherein the step of preparing includes the step of
   providing a polymer selected from the group consisting of polybenzimidazole and polysulfone.

6. The method of claim 1, wherein the step of preparing includes the step of
   providing a solvent selected from the group consisting of N,N-dimethylacetamide and N,N-dimethylformamide.

7. The method of claim 1, including the additional step, prior to the steps of spraying, of
   supporting the separator substrate on a support.

8. The method of claim 1, wherein the step of spraying a liquid includes the step of spraying a liquid selected from the group consisting of water, methanol, and ethanol.

9. The method of claim 1, wherein the step of spraying a liquid includes the step of
spraying water.

10. The method of claim 1, wherein the step of spraying a liquid includes the steps of
first spraying a sufficient amount of water onto both sides of the separator substrate to precipitate the polymer onto the separator substrate; and
thereafter spraying water to wash the separator substrate.

11. The method of claim 1, including the additional step, after the step of spraying a liquid, of
drying the separator substrate.

12. A method for preparing a separator for an electrochemical cell, comprising the steps of:
furnishing a sheet of porous zirconium oxide separator substrate;
preparing a solution of a water-soluble polymer in an organic solvent;
spraying the solution onto both sides of the separator substrate for a time sufficient to cause a preselected amount of the solution to absorb into the separator substrate; and
spraying water onto both sides of the separator substrate to remove the organic solvent and cause the polymer to precipitate into the separator substrate.

13. The method of claim 12, wherein the step of preparing includes the step of
providing a polymer selected from the group consisting of polybenzimidazole and polysulfone.

14. The method of claim 12, wherein the step of preparing includes the step of
providing a solvent selected from the group consisting of N,N-dimethylacetamide and N,N-dimethylformamide.

15. The method of claim 12, including the additional step, prior to the steps of spraying, of
supporting the separator substrate on a support.

16. The method of claim 12, including the additional step, after the step of spraying water, of
drying the separator substrate.

17. A method for preparing an electrochemical cell, comprising the steps of:
fabricating a battery separator by
furnishing a sheet of a porous separator substrate having two sides,
preparing a solution of a polymer in an organic solvent,
spraying the solution onto both sides of the separator substrate, and
spraying water onto both sides of the separator substrate; and
furnishing an anode and a cathode; and
forming an electrochemical cell by placing the separator between the anode and the cathode.

* * * * *